(No Model.)  W. P. TRIGGS.  2 Sheets—Sheet 2.
HARROW.
No. 286,974.  Patented Oct. 16, 1883.
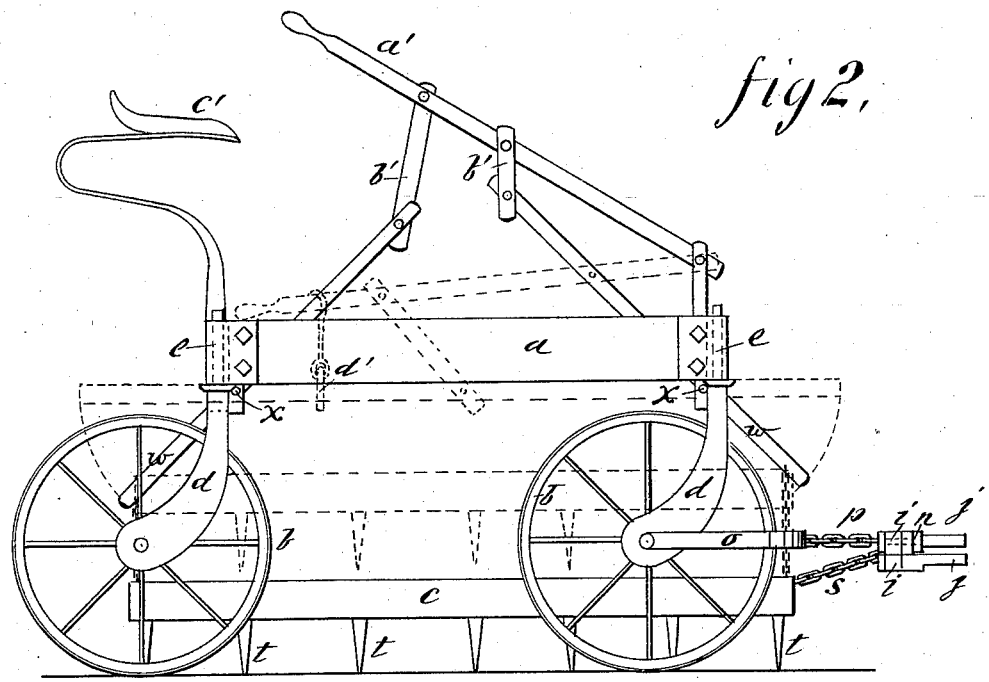
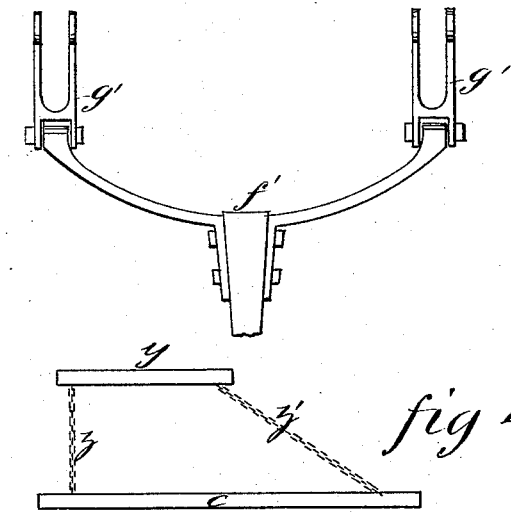
WITNESSES:
Chas. F. Howell,
C. Sedgwick
INVENTOR:
W. P. Triggs
BY Munn & Co
ATTORNEYS.

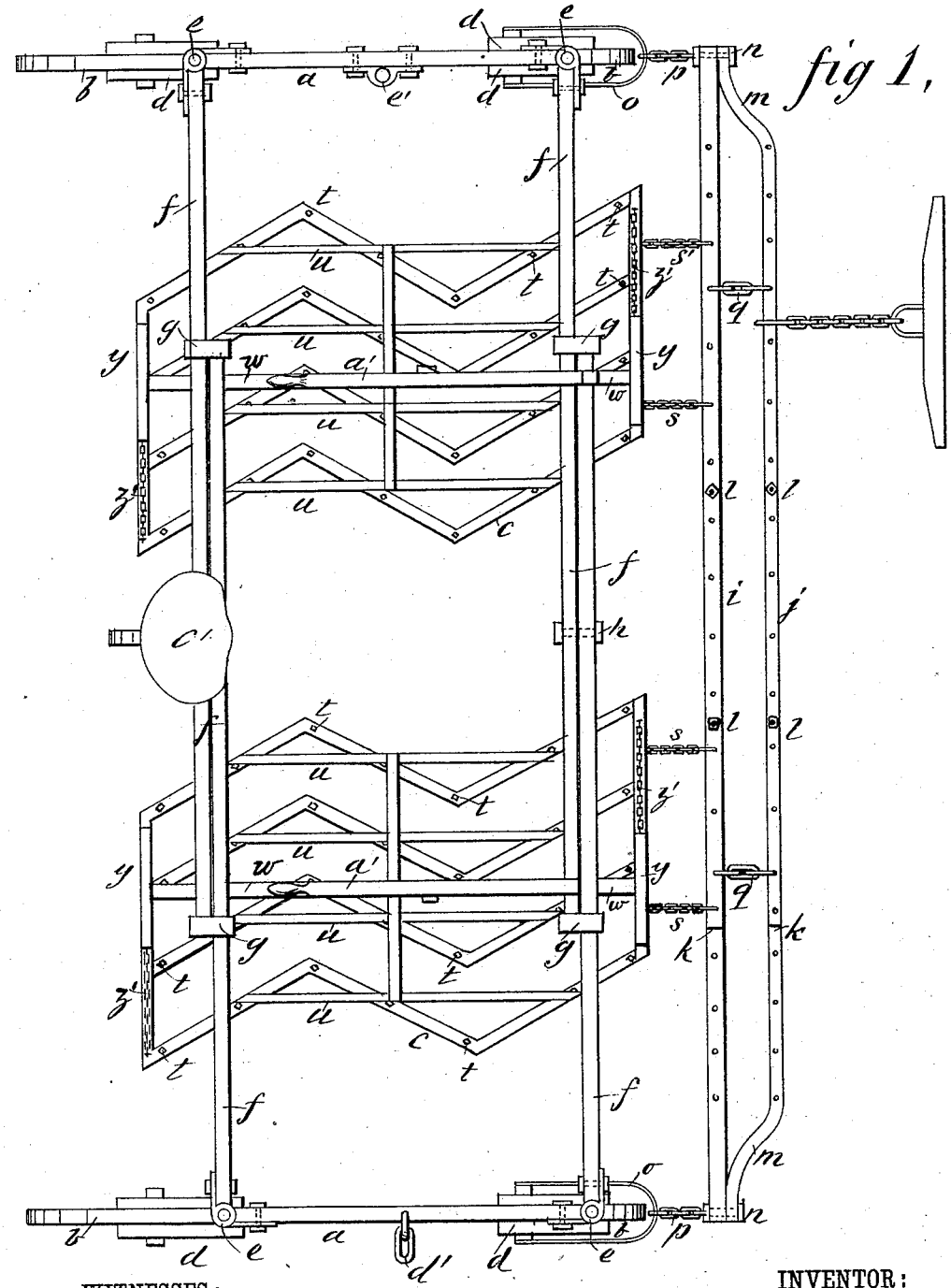

UNITED STATES PATENT OFFICE.

WILLIAM P. TRIGGS, OF EAST PORTLAND, OREGON.

HARROW.

SPECIFICATION forming part of Letters Patent No. 286,974, dated October 16, 1883.

Application filed December 30, 1882. (No model.)

*To all whom it may concern:*

Be it known that I, WILLIAM P. TRIGGS, of East Portland, in the county of Multnomah and State of Oregon, have invented a new and Improved Harrow, of which the following is a full, clear, and exact description.

This invention pertains to improvements in harrows; and it consists in the combinations and arrangements of parts, substantially as hereinafter fully set forth and claimed.

Reference is to be had to the accompanying drawings, forming part of this specification, in which similar letters of reference indicate corresponding parts in all the figures.

Figure 1 is a plan view of my improved harrow. Fig. 2 is a side elevation of the same. Fig. 3 is a plan view of a tongue attachment to be employed when transporting the machine from place to place; and Fig. 4 is a detail of the contrivance for hoisting and lowering the harrow in side elevation.

I use a truck-frame, $a$, mounted on caster-wheels $b$, for suspending the harrow $c$ above ground when transporting it from place to place, the caster-wheels being arranged in the usual forked standards, $d$, which are swiveled in the angle corner-plates $e$, attached to the frame, and employed for mounting the frame on the wheels, said corner-plates affording a simple contrivance for the purpose, and at the same time being strengthening devices for the frame. The frame is made extensible laterally by the overlapping cross-bars $f$, sliding clips $g$, and fastening-bolts $h$, the object being to adjust it for the use of harrows constructed in two or more sections, $c$, and for adapting said sections to range their proper distance apart on side hills, and the draw-bars, by which the harrows and the truck are to be hitched to the team, are also made extensible, said device consisting of the parallel bars $i$ and $j$, made in overlapping sections, as indicated by the end sections, $k$, and bolted together one upon another by bolts $l$, the bar $j$ being bent near the ends at $m$, and joined to the ends of bar $i$ by bolts $n$, to which the clevises $o$, connected to the axles of the front truck-wheels, are attached by chains $p$. Said bars $i$ $j$ are also connected at intervals by chains $q$, and the harrow-sections $c$ are connected to bar $i$ by chains $s$, so that the draft is applied directly to the harrows when they are at work. The harrow-bars are made in the angular or zig-zag lines shown in Fig. 1, and braced with their strips $u$ of strap-iron, crossing the angles and suitably attached to the upper sides of said bars.

For suspending the harrow-sections from the truck-frame, I employ levers $w$, connected to the front and rear ends, respectively, by T-heads $y$ and chains $z$ and $z'$. The levers $w$ are pivoted to the frame at $x$, and also connected to a hand-lever, $a'$, which ranges in suitable relation to the seat $c'$, to be manipulated by the driver sitting thereon, so that by pressing lever $a'$ down the harrows will be raised up, as represented in dotted lines, Fig. 2, where they may be secured by attaching hook $d'$ of one of the levers $w$ to the lever $a'$. The lever $a'$ is connected to the levers $w$ by links $b'$.

To accommodate the suspending devices to the angular form of the harrows, I cause the chains $z'$ to range in the inclines, as shown, while chains $z$ are vertical, the harrows being suspended centrally from the levers $w$.

$d'$ is a link connected to the machine to permit the hitching of the team thereto, the machine being drawn endwise when it is desired to move it along narrow ways or through fence-gates. At the other end of the machine is attached a socket, $e'$, to receive the stem of the seat-bracket, to permit the shifting of the seat to that end thereof when the machine is to be drawn or moved as last indicated. A tongue, $f'$, provided with pivoted clevises $g'$, is adapted to be coupled with the wheel-pivots, the same as clevises $o$, said tongue being connected to the wheels of one end of the frame to control the movement of the machine in going down steep hills.

In the use of this machine the clevises by which the teams are to be hitched on are attached so as to be adjustable along the draft-bars, in order that they may be shifted nearer the ends of said bars in proportion as the side hills are steeper, and toward the center as the land is more level, the object being to enable the teams to pull well to the upper side to keep the harrow from swinging downhill, and to pull nearer or at the center on level ground.

Having thus described my invention, what I claim as new, and desire to secure by Letters Patent, is—

1. The combination of T-headed levers $w$, vertical chains $z$, and inclined chains $z'$ with the truck-frame and angular harrow-frames $c$, substantially as described.

2. In a harrow, the combination, with the extensible frame $a\,f$, mounted upon the caster-wheels, and their standards $d$, of the extensible serially-apertured draft-bars $i\,j$, the clevises $o$, connected by the chains $p$ to the draft-bar $i$, and the harrow-sections $c$, connected by chains $s$ to the draft-bar $i$, substantially as and for the purpose set forth.

WILLIAM P. TRIGGS.

Witnesses:
T. J. MATLOCK,
JOHN CARNEGIE.